United States Patent [19]

Miller et al.

[11] 4,329,313

[45] May 11, 1982

[54] APPARATUS AND METHOD FOR EXTRUDING ETHYLENE POLYMERS

[75] Inventors: John C. Miller, Piscataway; Archibald L. Burnett, Warren, both of N.J.

[73] Assignee: Union Carbide Corporation, Danbury, Conn.

[21] Appl. No.: 206,146

[22] Filed: Nov. 12, 1980

[51] Int. Cl.³ .............................................. B29F 3/06
[52] U.S. Cl. .............................. 264/349; 264/176 R; 366/88; 366/89; 425/208; 526/124; 526/125
[58] Field of Search .................. 264/176 R, 349; 425/202, 201, 205–209; 366/79–87, 88, 89, 90; 526/128, 124–125, 88

[56] References Cited

U.S. PATENT DOCUMENTS

| | | |
|---|---|---|
| 2,547,000 | 4/1951 | Gray ..................................... 366/87 |
| 2,702,410 | 2/1955 | Brown ................................. 425/208 |
| 2,991,870 | 7/1961 | Griffith et al. . |
| 2,997,968 | 8/1961 | Fitzpatrick et al. . |
| 3,310,836 | 3/1967 | Nichols . |
| 3,449,793 | 6/1969 | Weir ..................................... 425/201 |
| 3,486,192 | 12/1969 | Le Roy ............................... 425/202 |
| 3,850,414 | 11/1974 | Scharer ................................. 366/89 |
| 4,053,143 | 10/1977 | Hosokawa et al. ................... 366/89 |
| 4,129,386 | 12/1978 | Rauwendaal ....................... 425/208 |
| 4,155,655 | 5/1979 | Chiselko et al. ................... 425/208 |
| 4,243,619 | 1/1981 | Fraser et al. ....................... 264/40.6 |

*Primary Examiner*—Jeffery R. Thurlow
*Attorney, Agent, or Firm*—Clement J. Vicari

[57] ABSTRACT

A novel extruder screw having at least three segments wherein the pitch remains constant in each segment and changes abruptly from one segment to the following segment and wherein the pitch ratio divided by the depth ratio is greater than ⅔.

18 Claims, 3 Drawing Figures

APPARATUS AND METHOD FOR EXTRUDING ETHYLENE POLYMERS

FIELD OF THE INVENTION

This invention relates to an apparatus and method for extruding molten narrow molecular weight distribution, linear, ethylene polymers.

BACKGROUND OF THE INVENTION

Conventional low density polyethylene has been historically polymerized in heavy walled autoclaves or tubular reactors at pressures as high as 50,000 psi and temperatures up to 300° C. The molecular structure of high pressure, low density polyethylene (HP-LDPE) is highly complex. The permutations in the arrangement of their simple building blocks are essentially infinite. HP-LDPE's are characterized by an intricate long chain branched molecular architecture. These long chain branches have a dramatic effect on the melt rheology of these resins. HP-LDPE's also possess a spectrum of short chain branches, generally 1 to 6 carbon atoms in length. These short chain branches disrupt crystal formation and depress resin density.

With recent developments in low pressure technology, low density narrow molecular weight distribution linear ethylene polymers can now be produced at low pressures and temperatures by copolymerizing ethylene with various alphaolefins. These low pressure LDPE (LP-LDPE) resins generally possess little, if any, long chain branching. They are short chain branched with branch length and frequency controlled by the type and amount of comonomer used during polymerization.

U.S. patent application Ser. No. 892,325 filed Mar. 3, 1978 now abandoned, and refiled as Ser. No. 014,414 on Feb. 27, 1979, in the names of F. J. Karol et al and entitled Preparation of Ethylene Copolymers In Fluid Bed Reactor, and which corresponds to European patent application No. 79100953.3 which was published as Publication No. 004,645 on Oct. 17, 1979, discloses that ethylene copolymers, having a density of 0.91 to 0.96, a melt flow ratio of $\geq 22$ to $\leq 32$ and a relatively low residual catalyst content can be produced in granular form, at relatively high productivities if the monomer(s) are copolymerized in a gas phase process with a specific high activity Mg-Ti containing complex catalyst which is blended with an inert carrier material.

U.S. patent application Ser. No. 892,322 filed Mar. 31, 1978 now abandoned, and refiled as Ser. No. 012,720 on Feb. 16, 1979, in the names of G. L. Goeke, et al, and entitled Impregnated Polymerization Catalyst, Process For Preparing, and Use For Ethylene Copolymerization, and which corresponds to European patent application No. 79100958.2 which was published as Publication No. 004,647 on Oct. 17, 1979, discloses that ethylene copolymers, having a density of 0.91 to 0.96, a melt flow ratio of $\geq 22$ to $\leq 32$ and a relatively low residual catalyst content can be produced in granular form, at relatively high productivities, if the monomer(s) are copolymerized in a gas phase process with a specific high-activity Mg-Ti containing complex catalyst which is impregnated in a porous inert carrier material.

U.S. patent application Ser. No. 892,037 filed Mar. 31, 1978 now abandoned, and refiled as Ser. No. 014,412 on Feb. 27, 1979, in the names of B. E. Wagner, et al, and entitled Polymerization Catalyst, Process For Preparing and Use For Ethylene Homopolymerization, and which corresponds to European patent application No. 79100957.4 which was published as Publication No. 004,646 on Oct. 17, 1979, discloses that ethylene homopolymers having a density of about $\geq 0.958$ to $\leq 0.972$ and a melt flow ratio of about $\geq 22$ to about $\leq 32$ which have a relatively low residual catalyst residue can be produced at relatively high productivities for commercial purposes by a low pressure gas phase process if the ethylene is homopolymerized in the presence of a high-activity Mg-Ti-containing complex catalyst which is blended with an inert carrier material. The granular polymers thus produced are useful for a variety of end-use applications.

The polymers as produced, for example, by the processes of said applications using the Mg-Ti containing complex catalyst possess a narrow molecular weight distribution, Mw/Mn, of about $\geq 2.7$ to $\leq 4.1$.

Over the years, film extrusion equipment has been optimized for the rheology of HP-LDPE. The different molecular architecture of low pressure-low density polyethylene (LP-LDPE) result in a film processing behavior which requires different extrusion parameters. By way of background, conventional extruders commonly used for HP-LDPE include an elongated barrel which may be heated or cooled at various locations along its length and a screw which extends longitudinally through the barrel. The screw has a helical land on its surface which cooperates with the cylindrical internal surface of the barrel to define an elongated helical channel. Although the pitch of the screw may vary along the length thereof, it is common at the present time to utilize screws of constant pitch wherein the pitch is "square," that is, where the distance between adjacent flights is equal to the diameter. The screw is rotated about its own axis to work the plastic material and feed it toward the outlet end of the barrel.

An extruder screw ordinarily has a plurality of sections which are of configuration specially suited to the attainment of particular functions. Examples are "feed" sections and "metering" sections, which are of basic importance and are present in nearly all extruders for handling thermoplastic polymers.

A typical extruder screw feed section extends beneath and forwardly from a feed opening where polymer in pellet or powder form is introduced into the extruder to be carried forward along the inside of the barrel by the feed section of the screw. In this section the channel depth of the screw is usually large enough to over-feed the solid polymer. This is a desirable effect because the over-feeding action serves to compact and pressurize the polymer particles and form a solid bed of advancing material.

The working of the material generates heat, and melting of the polymer proceeds as the material is moved along the feed section of the screw. Actually, most of the melting occurs near the barrel surface at the interface between a thin melt film and the solid bed of polymer. This general pattern persists until a substantial portion of the polymer reaches the melted state. After some 40 to 70 percent of the polymer has been melted, solid bed breakup usually occurs, and at this time particles of solid polymer become dispersed in the polymer melt. From this point on, it often is advantageous to intimately mix the polymer melt with the unmelted material to accelerate melting and minimize local non-uniformities.

An extruder screw "metering" section has as its special function the exertion of a pumping action on the molten polymer. Ordinarily the throughput achieved by a screw is thought of as being a function of the combination of the "drag flow" and "pressure flow" effects of the metering section.

Drag flow is basically the flow which results from the relative movement between the screw and the internal surface of the extruder barrel. It may be thought of as being proportional to the product of the average relative velocity and the channel cross-sectional area. This drag flow component is directed toward the outlet end of the screw. It may be increased by increasing the speed of the screw and/or by increasing the depth of the flow channel in the screw.

Acting in opposition to drag flow is a pressure flow component stemming from the reluctance of the material to flow through the restricted outlet opening at the end of the extruder passage. The speed of the screw does not directly affect the pressure flow component but, of course, it may effect such factors as back pressure and material viscosity, which factors, in turn, affect significantly the pressure flow component. On the other hand, pressure flow is directly affected by both the depth and length of the screw channel; an increase in channel depth has a tendency to increase greatly the pressure flow component and an increase in channel length has a tendency to reduce this back flow component.

In addition to the basic "feed" and "metering" sections an extruder screw also may include a number of other distinct sections. Nearly all screws include, for example, so-called "transition" sections.

Over the years, there has been a trend toward the use of extruders capable of high outputs. In many applications, various economies in production are possible where high extruder outputs can be obtained on a reliable basis.

Although LP-LDPE resins can be extruded on equipment designed for HP-LDPE resins, such as described above, certain equipment modifications are often required in order to extrude the low pressure resins at optimum conditions and at rates comparable to the high pressure resins. This is particularly true during extrusion of LP-LDPE which is subsequently processed into film. The problem appears to be that when the new low pressure resins are extruded through equipment with screws designed for the earlier high pressure resin pellets, they suffer from the effects of high exit temperatures, decreased energy efficiency and reduced outputs due to power limitations.

Accordingly, present extruder screws and methods for extruding LP-LDPE resins are not entirely satisfactory from a practical commercial standpoint and there currently exists a need for providing an extrusion screw and an extrusion method which provides high output rates.

SUMMARY OF THE INVENTION

It is the general object of this invention to provide an improved method for dealing with problems of the types mentioned above.

Another object of this invention is to provide a method for achieving good extrudate metering performance at high rates.

A further object is to provide a novel extruder screw, which can be used with conventional extruder apparatus to extrude low density narrow molecular weight distribution, linear, ethylene polymers.

A still further object is to produce an extruder screw which can extrude polymers at high output rates.

These and other objects are achieved by a novel method for extruding low density narrow molecular weight distribution, linear, ethylene polymers which comprises passing said polymers through an extruder apparatus including an extruder screw having a flight, and having an inlet end and a discharge end, and wherein the pitch ratio divided by the depth ratio is greater than $\frac{2}{3}$.

As used herein, the term "pitch ratio" is defined as the pitch at the inlet end of the extruder screw divided by the minimum pitch of the screw.

The term "depth ratio" is defined as the depth of the screw at the inlet end divided by the minimum depth of the screw.

The present invention also provides a novel extruder screw for extruding ethylene polymer which comprises a screw root with at least one flight having an entry end and a discharge end, said screw being divided into at least three segments wherein the pitch remains constant in each segment and changes abruptly from one segment to the following segment and wherein the pitch ratio divided by the depth ratio is greater than $\frac{2}{3}$.

In one embodiment for practicing the method of the invention, the extruder screw has a constant depth, and a pitch that decreases uniformly over the length of the screw with the screw having a pitch ratio divided by the depth ratio of greater than $\frac{2}{3}$.

In a second embodiment of the invention, there is provided an equally segmented extrusion screw having from three to four segments each having a constant depth and wherein the pitch is constant in each segment but decreases from segment to segment from the inlet end to the discharge end of the screw, and wherein the pitch ratio divided by the depth ratio is greater than $\frac{2}{3}$.

In a third embodiment of the invention, the extrusion screw is unequally segmented and has from three to eight unequal segments, with a constant pitch in each segment and a decreasing pitch from segment to segment, a substantially constant depth in each segment or a decreasing depth from segment to segment, and wherein the pitch ratio divided by the depth ratio is greater than $\frac{2}{3}$.

As used herein the term "segment" means a fraction of the total length of the screw constituting, at least 1 L/D turn of the flight.

It was indeed surprising to discover that a substantially uniformly decreasing pitch screw as disclosed herein would be eminently suitable for processing the resins contemplated for treatment by the instant invention; particularly in view of the prior art teachings that these types of screws offer poorer performance over the conventional "square" pitch screw.

Whatever the reasons or phenomena involved, it has been found that the particular ethylene polymers i.e., the LP-LDPE resins processed in accordance with the instant invention could be processed at relatively high output rates, and relatively low exit temperatures.

A more complete understanding of these and other features and advantages of the invention will be gained from a consideration of the following description of certain embodiments illustrated in the accompanying drawing.

DETAILED DESCRIPTION OF THE PREFERRED EMBODIMENTS

Figure 1:
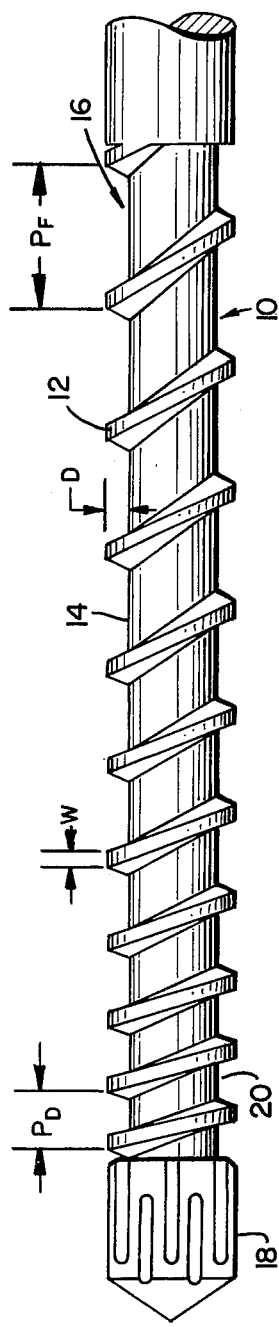
FIG. 1 is an elevational view of an extruder screw and mixer for practicing the process of the instant invention of the invention.

Although the drawing only illustrates extruder screws and mixers for purposes of practicing the method of the present invention, it will be understood that these screws are utilized in their normal environment, i.e., in cooperative association with conventional frame means, a horizontally extending barrel, feed and hopper means and a drive means all of which are not shown since, as mentioned previously, they constitute well-known apparatus commercially available to the art. Merely as illustrative, the extruder screws can be mounted in the apparatus disclosed in U.S. Pat. Nos. 4,155,655 and 4,053,143.

The screw 10, as shown in FIG. 1, is a single stage screw, having a helical flight 12 of constant outside diameter and includes a screw root 14.

According to the method of the instant invention, the designated ethylene polymer is introduced into the apparatus for plastication and extrusion and enters the inlet end 16 of the extruder screw 10. Reference numberal $P_F$ designates the pitch in the inlet end 16 and as will be seen from FIG. 1, the pitch decreases uniformly along the length of the extruder screw 10. Situated adjacent to the mixing head 18 is the discharge end 20 of the extruder screw. Reference numeral $P_D$ designates the pitch in the discharge end of the extruder screw 10. Thus, and with reference to FIG. 1 of the drawing, the pitch decreases, preferably linearly, from the inlet end of the screw to the discharge end of the screw, and the decreasing pitch is substantially uniform as it proceeds from $P_F$ to $P_D$.

On the other hand the depth D of the screw remains substantially constant throughout the length of the screw.

The specific dimensions of the screw utilized in the process of the present invention can be determined empirically, calculated using conventional equations. Merely for purposes of illustration, the pitch $P_F$ can be approximately 2.5 inches and all succeeding pitches can be linearly uniformly decreased terminating with pitch $P_D$ which can be about 1.0 inch.

The depth D of the extruder screw is substantially constant throughout the entire length of the screw and the depth can vary depending on the size of the extruder. Moreover, the extruder screw 10 can have a length to diameter ratio of about 14 L/D to 24 L/D and preferably 16 L/D to 20 L/D. Finally, the width of the flight designated as W can vary from 0.001 diameter to 0.003 D inch.

As shown in FIG. 1 of the drawing, the extruder screw is utilized in conjunction with a mixing head or mixing section 18. The mixing section may be of the type which is referred to as a "fluted mixing head" which is disclosed in U.S. Pat. No. 3,406,192 issued Dec. 30, 1969 to G. Leroy and entitled "Apparatus for Extrusion of Thermoplastics" or alternatively a Maddock Mixing Head.

In a typical mode of operation, the specific linear polyolefin material to be extruded is introduced either in granular or pellet form into the inlet end 16 of the extruder screw. The material is then forced along the length of the extruder screw where it is compacted and compressed, thereby developing heat within the material and effect the beginning of melting of the solid material. As the material advances along the screw it continues to melt, initially interfaces between already molten polymer and solid compacted material, to a point where solid particles break up and small particles of solid polymer become dispersed in the main body of primarily molten polymer material. This action continues until the polymer melt is passed to the optional final section, i.e. mixing head 18. Final mixing and homogenization of the polymer material is carried out in the fluted screw mixing section. As the material is broken into a number of streams, each entering successive inlet fluted passages, it is forced from such passages over intervening lands into outlet flutes which discharge the highly mixed molten material from the fluted mixing head 18 and into the discharge end of the extruder housing (not shown). Operating conditions such as temperatures, pressures, etc. are advantageously lower than would be expected.

Figure 2:
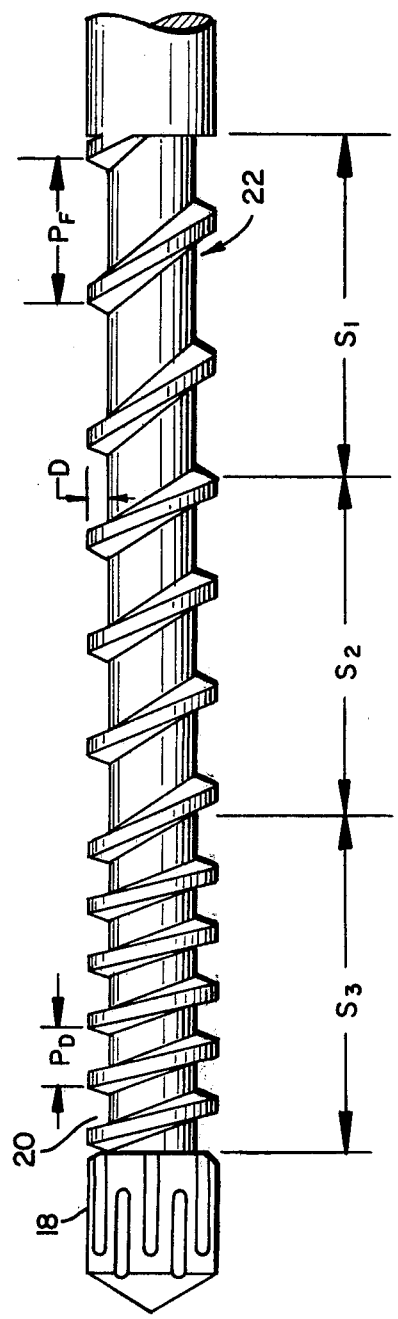
FIG. 2 is an elevational view of a novel extruder screw having equal segments and wherein the pitch decreases uniformly from segment to segment.
Figure 3:
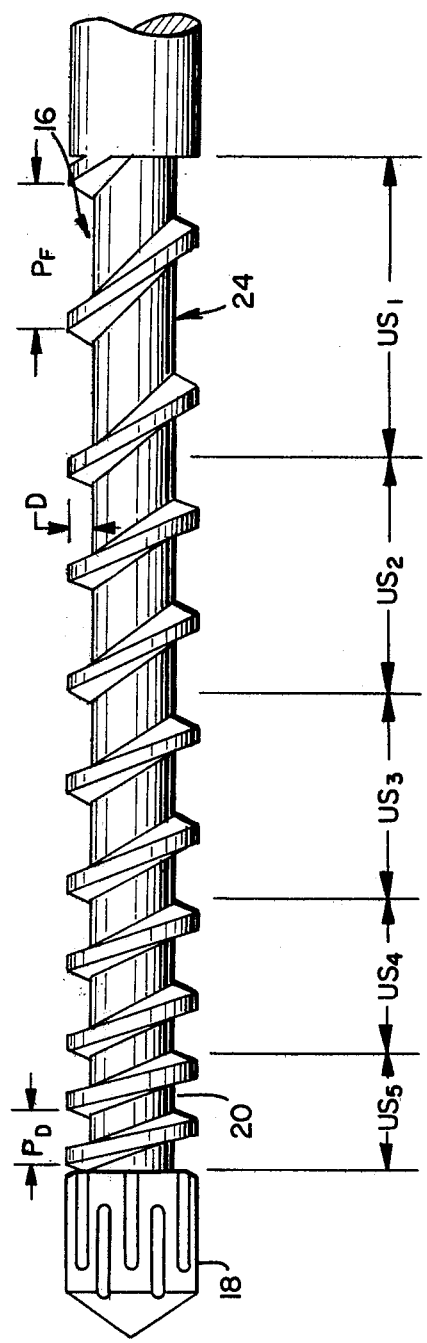
FIG. 3 is an elevational view of a further embodiment of the novel extruder screw having unequal segments.

FIGS. 2 and 3 show various embodiments of a novel extruder screw in accordance with the instant invention. These novel extruder screws are useful in processing the particular ethylene polymers according to the method of the instant invention and advantageously can be employed with other types of polymers.

Thus referring to FIG. 2, which illustrates an embodiment of the novel extruder screw of the instant invention and wherein like parts are indicated by like reference numerals with respect to FIG. 1, the extruder screw 22 is divided into equal segments $S_1$, $S_2$ and $S_3$ and according to the invention an additional segment can also be included although not shown. Each segment is substantially equal. The pitch in each segment is constant but decreases from segment to segment i.e. from $S_1$ to $S_2$ to $S_3$ and the depth D remains constant in each segment. An important characteristic of the extruder screw is that the pitch ratio divided by the depth ratio be greater than $\frac{2}{3}$. Thus, one skilled in the art can appropriately select pitch lengths and depths, based upon the teachings herein so that the pitch ratio divided by the depth ratio would always be greater than $\frac{2}{3}$.

With reference to FIG. 3 which illustrates another embodiment of the instant invention, and wherein like parts are represented by like reference numerals, the extruder screw 24 is divided into unequal segments represented by $US_1$, $US_2$, $US_3$, $US_4$ and $US_5$ and according to the invention additional segments—up to a total of eight segments—can be added although not shown. Each segment is unequal in length. In general, the pitch is constant in each segment but decreases from segment to segment, i.e. from $US_1$ to $US_2$ to $US_3$, etc. Accordingly, the pitch ratio in this case would be the pitch at the inlet end 16 of the screw, e.g. 2.5 inches divided by the minimum pitch of the screw. For purposes of illustration the minimum pitch would be the pitch of segment U.S. 5 which could be 1.0.

The depth ratio would be the depth D of the inlet end of the screw divided by the minimum depth of the screw.

Thus for purposes of calculation, the pitch ratio divided by the depth ratio in this case would be greater than ⅔.

On the other hand the depth D which is shown as being equal in FIG. 3 can also be unequal provided that the pitch ratio divided by the depth ratio is greater than ⅔.

As mentioned previously, the specific dimensions for the screw designed in accordance with the principles of this invention may be determined empirically, calculated using conventional equations.

The ethylene polymers which may be used in the process of the present invention are homopolymers of ethylene or copolymers of a major mol percent ($\geq 90\%$) of ethylene, and a minor mol percent ($\leq 10\%$) of one or more $C_3$ to $C_8$ alpha olefins. The $C_3$ to $C_8$ alpha olefins should not contain any branching on any of their carbon atoms which is closer than the fourth carbon atom. The preferred $C_3$ to $C_8$ alpha olefins are propylene, butene-1, pentene-1, hexene-1 and octene-1.

The ethylene polymers have a melt flow ratio of $\geq 18$ to $\leq 32$, and preferably of $\geq 22$ to $\leq 32$. The melt flow ratio value is another means of indicating the molecular weight distribution of a polymer. The melt flow ratio (MFR) range of $\geq 22$ to $\leq 32$ thus corresponds to a Mw/Mn value range of about 2.7 to 4.1. The polymers herein include a Mw/Mn value in the range of about 2.2 to 4.1.

The homopolymers have a density of about $\geq 0.958$ to $\leq 0.972$ and preferably of about $\leq 0.961$ to $\geq 0.968$.

The copolymers have a density of about $\geq 0.91$ to $\leq 0.96$ and preferably $\geq 0.917$ to $\leq 0.955$, and most preferably, of about $\geq 0.917$ to $\leq 0.935$. The density of the copolymer, at a given melt index level for the copolymer, is primarily regulated by the amount of the $C_3$ to $C_8$ comonomer which is copolymerized with the ethylene. In the absence of the comonomer, the ethylene would homopolymerize with the catalyst of the present invention to provide homopolymers having a density of about $\geq 0.96$. Thus, the addition of progressively larger amounts of the comonomers to the copolymers results in a progressive lowering of the density of the copolymer. The amount of each of the various $C_3$ to $C_8$ comonomers needed to achieve the same result will vary from monomer to monomer, under the same reaction conditions.

Thus, to achieve the same results, in the copolymers, in terms of a given density, at a given melt index level, larger molar amounts of the different comonomers would be needed in the order of $C_3 > C_4 > C_5 > C_6 > C_7 > C_8$.

The melt index of a homopolymer or copolymer is a reflection of its molecular weight. Polymers having a relatively high molecular weight, have a relatively low melt index. Ultra-high molecular weight ethylene polymers have a high load (HLMI) melt index of about 0.0 and a very high molecular weight ethylene polymers have a high load melt index (HLMI) of about 0.0 to about 1.0. The polymers of the present invention have a standard or normal load melt index of $\geq 0.0$ to about 50, and preferably of about 0.5 to 35, and a high load melt index (HLMI) of about 11 to about 950. The melt index of the polymers which are used in the process of the present invention is a function of a combination of the polymerization temperature of the reaction, the density of the copolymer and the hydrogen/monomer ratio in the reaction system. Thus, the melt index is raised by increasing the polymerization temperature and/or be decreasing the density of the polymer and/or by increasing the hydrogen/monomer ratio.

The ethylene polymers of the present invention have an unsaturated group content of $\leq 1$, and usually $\geq 0.1$ to $\geq 0.3$, C=C/1000 carbon atoms, and a cyclohexane extractables content of less than about 3, and preferably less than about 2, weight percent.

The ethylene polymers of the present invention have a residual catalyst content, in terms of parts per million of titanium metal, of the order of $\leq 20$ parts per million, (ppm) at a productivity level of $\geq 50.000$, and of the order of $\leq 10$ ppm at a productivity level of $\geq 100,000$ and of the order of $\leq 3$ parts per million at a productivity level of $\geq 300,000$. Where the polymers are made with halogen containing catalysts wherein the halogen is chlorine, the polymers have a Cl residue content of $\leq 140$ ppm at a productivity of $\geq 50,000$, a Cl content of $\leq 70$ ppm at a productivity of $\geq 100,000$, and a Cl content $\leq 21$ ppm at a productivity of $\geq 300,000$. The ethylene polymers are readily produced at productivities of up to about 300,000.

The polymers processed in the present invention are produced as granular materials which have an average particle size of the order of about 0.005 to about 0.06 inches, and preferably of about 0.02 to about 0.04 inches, in diameter. The particle size is important for the purposes of readily fluidizing the polymer particles in the fluid bed reactor, as described below. The polymers of the present invention have a settled bulk density of about 15 to 32 pounds per cubic foot.

The homopolymers and copolymers of the present invention are useful for making film.

For film making purposes the preferred copolymers of the present invention are those having a density of about $\geq 0.917$ to $\leq 0.924$; a molecular weight distribution (Mw/Mn) of $\geq 2.7$ to $\leq 3.6$, and preferably of about $\geq 2.8$ to $3.1$; and a standard melt index of $\geq 0.5$ to $\leq 5.0$ and preferably of about $\geq 1.0$ to $\leq 4.0$. The films have a thickness of $>0$ to $\leq 10$ mils and preferably of $>0$ to $\leq 5$ mils.

Having set forth the general nature of the invention, the following examples illustrate some specific embodiments of the invention. It is to be understood, however, that this invention is not limited to the examples, since the invention may be practiced by the use of various modifications.

EXAMPLE I

A decreasing pitch extruder screw as substantially shown in FIG. 1 was evaluated with respect to high pressure low density polyethylene resin (HP LDPE) and the low pressure low density polyethylene resins (LP LDPE) contemplated for treatment according to the present invention. The screw was contained in a conventional extruder built to substantially industry practice. The LP LDPE resin was an ethylene-butene copolymer which is available from Union Carbide Corporation under the trade name designation GRSN 7047. The copolymer had the following nominal properties:
Density: 0.918 gms/cc
Melt Index: 1.0 gms/10 minutes
Melt Flow Ratio: 27
Bulk Density: 27 lbs/ft$^3$
The HP LDPE resin was a common type used in the industry and is available from Union Carbide Corporation under the trade name DFD 4140. This polymer had the following nominal properties:
Density: 0.918

Melt Index: 2.0
Melt Flow Ratio: 60
Bulk Density: 34 lbs/ft.³

The extruder screw included a mixing head of the type disclosed in U.S. Pat. No. 3,406,192 and the entire assembly had a length to diameter ratio of 22/1, and without the mixing head it had a 20/1 ratio. The length was 50 inches and the flight depth was 3.50 inches. The length of the lead was as indicated below:

| Flight No. | Lead, In. | Flight No. | Lead, In. |
|---|---|---|---|
| 1 (feed) | 2.50 | 16 | 1.63 |
| 2 | 2.44 | 17 | 1.56 |
| 3 | 2.38 | 18 | 1.50 |
| 4 | 2.25 | 19 | 1.50 |
| 5 | 2.25 | 20 | 1.44 |
| 6 | 2.25 | 21 | 1.38 |
| 7 | 2.13 | 22 | 1.31 |
| 8 | 2.06 | 23 | 1.31 |
| 9 | 2.06 | 24 | 1.25 |
| 10 | 2.00 | 25 | 1.19 |
| 11 | 1.94 | 26 | 1.06 |
| 12 | 1.88 | 27 | 1.00 |
| 13 | 1.81 | 28 | 1.00 |
| 14 | 1.75 | 29 | 1.00 |
| 15 | 1.69 | | |

The pitch ratio divided by the depth ratio was 2.5.

Table I illustrates the operating conditions and results:

TABLE I

Comparison of Extrusion Behavior

| | LP LDPE | HP LDPE |
|---|---|---|
| Screw Speed (RPM) | 50 | 50 |
| Head Pressure: (psi) | 4700 | 4600 |
| Output (lbs/hr) | 122 | 80 |
| Exit Temperature (°F.) | 350 | 330 |
| *SEI (HP-hr/lb) | .091 | .07 |
| Power (H.P.) | 11.2 | 5.6 |

*SEI = Specific Energy Input

As will be seen from the results indicated in Table I, there was substantially greater output (about 50%) for the LP LDPE resins over the conventional HP LDPE resins. The appearance of the extrudate in the case of the LP LDPE resins was uniform whereas the HP LDPE resins appeared lumpy and not suitable for film blowing.

EXAMPLE II

A decreasing pitch extruder screw having five unequal segments and a constant depth as substantially shown in FIG. 3 was evaluated with respect to high pressure low density polyethylene resin (HP LDPE) and the low pressure low density polyethylene resins (LP LDPE) contemplated for treatment according to the present invention. The screw was contained in a conventional extruder built to substantially industry practice. The LP LDPE resin was an ethylene-butene copolymer which is available from Union Carbide Corporation under the trade name designation GRSN 7047. The copolymer had the following nominal properties:
Density: 0.918 gms/cc
Melt Index: 1.0 gms/10 minutes
Melt Flow Ratio: 27
Bulk Density: 27 lbs/ft.³

The HP LDPE resin was a common type used in the industry and is available from Union Carbide Corporation under the trade name DFD 4140. This polymer had the following nominal properties:
Density: 0.918
Melt Index: 2.0
Melt Flow Ratio: 60
Bulk Density: 34 lbs/ft.³

The extruder screw included a mixing head of the type disclosed in U.S. Pat. No. 3,406,192 and the entire assembly had a length to diameter ratio of 18/1, and without the mixing head it had a 16/1 ratio. The length was 41 inches. The pitch ratio divided by the depth ratio was 2.0. The length of the lead and flight depth was as indicated below:

| Flight | Lead | Depth | Flight | Lead | Depth |
|---|---|---|---|---|---|
| 1 | 3.0 | .363 | 15 | 1⅝ | .352 |
| 2 | 3.0 | .360 | 16 | 1⅝ | .350 |
| 3 | 3.0 | .360 | 17 | 1½ | .352 |
| 4 | 2⅝ | .358 | 18 | 1½ | .354 |
| 5 | 2½ | .357 | | | |
| 6 | 2½ | .355 | | | |
| 7 | 2½ | .355 | | | |
| 8 | 2½ | .356 | | | |
| 9 | 2¼ | .357 | | | |
| 10 | 2¼ | .358 | | | |
| 11 | 2¼ | .357 | | | |
| 12 | 2.0 | .357 | | | |
| 13 | 1¾ | .355 | | | |
| 14 | 1⅝ | .355 | | | |

Table II illustrates the operating conditions and results:

TABLE II

Comparison of Extrusion Behavior

| | LP LDPE | HP LDPE |
|---|---|---|
| Screw Speed (RPM) | 50 | 50 |
| Head Pressure: (psi) | 4600 | 4600 |
| Output (lbs/hr) | 106 | 34.5 |
| Exit Temperature (°F.) | 342 | 365 |
| *SEI (HP-hr/lb) | .094 | .12 |
| Power (H.P.) | 10.6 | 4.1 |

*SEI = Specific Energy Input

As will be seen from the results of Table II, the LP LDPE resins were produced in substantially greater quantities (higher output), at lower exit temperature and at improved energy efficiency.

EXAMPLE III

A decreasing pitch extruder screw having three unequal segments and a decreasing depth was evaluated with respect to the low pressure low density polyethylene resins (LP LDPE) contemplated for treatment according to the present invention. The screw was contained in a conventional extruder built to substantially industry practice. The LP LDPE resin was an ethylene-butene copolymer which is available from Union Carbide Corporation under the trade name designation GRSN 7047. The copolymer had the following nominal properties:
Density: 0.918
Melt Index: 1.0
Melt Flow Ratio: 27
Bulk Density: 27

The extruder screw included a mixing head of the type disclosed in U.S. Pat. No. 3,406,192. The length was 41 inches and the flight depth and lead were as indicated below:

| Flight | Lead | Depth | Flight | Lead | Depth |
|--------|------|-------|--------|------|-------|
| 1 | 3 | .398 | 10 | 2 | .252 |
| 2 | 3 | .405 | 11 | 2 | .251 |
| 3 | 3 | .405 | 12 | 2 | .255 |
| 4 | 3 | .403 | 13 | 2 | .254 |
| 5 | 3 | .400 | 14 | 2 | .253 |
| 6 | 2½ | .370 | 15 | 2 | .254 |
| 7 | 2½ | .325 | 16 | 2 | .254 |
| 8 | 2½ | .278 | 17 | 2 | .251 |
| 9 | 2 | .253 | | | |

The pitch ratio divided by the depth ratio was greater than ⅔.

Table III illustrates the operating conditions and results:

TABLE III

| Extrusion Behavior | |
|---|---|
| LP LDPE | |
| Screw Speed (RPM) | 50 |
| Head Pressure: (psi) | 4500 |
| Output (lbs/hr) | 112 |
| Exit Temperature (°F.) | 330 |
| *SEI (HP-hr/lb) | .085 |
| Power (H.P.) | 9.6 |

*SEI = Specific Energy Input

EXAMPLE IV

A four substantially equal segmented extruder screw having about 28 turns of flight was evaluated with respect to the copolymer GRSN described in Example I.

The extruder screw included a mixing head of the type disclosed in U.S. Pat. No. 3,406,192 and the entire assembly had a length to diameter ratio of 20/1, and without the mixing head it had an 18/1 ratio.

The flight depth and lead were as indicated below:

| Flight | Lead | Depth | Flight | Lead | Depth |
|--------|------|-------|--------|------|-------|
| 1 | 2.5 | .366 | 17 | 1.5 | .375 |
| 2 | 2.5 | .378 | 18 | 1.25 | .373 |
| 3 | 2.5 | .375 | 19 | 1.0 | .375 |
| 4 | 2.5 | .375 | 20 | 1.0 | .373 |
| 5 | 2.5 | .379 | 21 | 1.0 | .371 |
| 6 | 2.0 | .378 | 22 | 1.0 | .371 |
| 7 | 2.0 | .379 | 23 | 1.0 | .370 |
| 8 | 2.0 | .379 | 24 | 1.0 | .371 |
| 9 | 2.0 | .376 | 25 | 1.0 | .370 |
| 10 | 2.0 | .381 | 26 | 1.0 | .370 |
| 11 | 1.5 | .375 | 27 | 1.0 | .371 |
| 12 | 1.5 | .376 | 28 | 1.0 | .372 |
| 13 | 1.5 | .374 | | | |
| 14 | 1.5 | .373 | | | |
| 15 | 1.5 | .374 | | | |
| 16 | 1.5 | .373 | | | |

Table IV illustrates the operating conditions and results of two runs which were made through the screw:

TABLE IV

| Screw Speed (RPM) | 50 | 100 |
|---|---|---|
| Pressure (psi) | 4600 | 4500 |
| Output (lbs./hr.) | 104 | 193 |
| Melt Temperature | 350 | 370 |
| Power (HP) | 11.1 | 24.1 |
| SEI (HP-hr./lb.) | .11 | .12 |

Based on experience the output rates are high and melt temperatures are low compared to conventional square lead, decreasing depth screws.

What is claimed is:

1. A method for extruding low density narrow molecular weight distribution, linear, ethylene polymers which comprises passing said polymers through an extruder apparatus including an extruder screw having a flight and having an inlet end and a discharge end and wherein the pitch ratio divided by the depth ratio is greater than ⅔.

2. A method according to claim 1 wherein said flight decreases in pitch from said inlet end to said discharge end.

3. A method according to claim 2 wherein said pitch decreases uniformly from said inlet end to said discharge end.

4. A method according to claim 1 wherein said screw includes from three to four equal segments, each having a constant depth, wherein said pitch remains constant in each segment and wherein said pitch abruptly decreases from segment to segment.

5. A method according to claim 1 wherein said screw includes from three to eight unequal segments, with a constant pitch in each segment and a decreasing pitch from segment to segment and wherein said screw has a constant depth in each segment and a decreasing depth from segment to segment.

6. A method according to claim 1 wherein said polymer leaving said extruder screw is introduced into and passed through a mixing zone associated with said extruder screw.

7. A method according to claims 1 in which said polymer is a copolymer of ethylene and at least one $C_3$ to $C_8$ alpha olefin having a melt index of about $\geq 0.1$ to about $\leq 20$.

8. A method according to claim 7 in which said polymer is a copolymer of $\geq 90$ mol percent ethylene and $\leq 10$ mol percent of at least one $C_3$ to $C_8$ alpha olefin.

9. A method according to claim 8 in which said copolymer has a molecular weight distribution of about $\geq 2.7$ to $\leq 6.0$ and a total unsaturation content of about $\geq 0.1$ to $\leq 0.3$ C=C/1000 C atoms.

10. A method according to claim 9 in which said copolymer has a melt flow ratio of about $\geq 22$ to $\leq 40$ and a total unsaturation content of about $\geq 0.1$ to $\leq 0.3$ C=C/1000 C atoms.

11. A novel extruder screw for extruding polymers which comprises a screw root with at least one flight having an entry end and a discharge end, said screw being divided into at least three segments wherein the pitch remains constant within each segment and changes abruptly from one segment to the following segment and wherein the pitch ratio divided by the depth ratio is greater than ⅔.

12. An extruder screw according to claim 11 wherein said screw is divided into from three to eight segments.

13. An extruder screw according to claim 11 wherein said pitch abruptly decreases from one segment to the following segment.

14. An extruder screw according to claim 10 wherein said screw is divided into three equal segments wherein said pitch is constant in each segment and wherein said pitch decreases from segment to segment.

15. An extruder screw according to claim 14 wherein the depth of said screw is substantially constant in each segment.

16. An extruder screw according to claim 11 wherein said screw is divided into about five unequal segments, each segment having a constant pitch, and wherein said pitch decreases from segment to segment.

17. An extruder screw according to claim 16 wherein the depth of said screw is substantially constant in each segment.

18. An extruder screw according to claim 16 wherein the depth of said screw decreases from segment to segment.

* * * * *

UNITED STATES PATENT AND TRADEMARK OFFICE
CERTIFICATE OF CORRECTION

PATENT NO. : 4,329,313
DATED : May 11, 1982
INVENTOR(S) : J.C. Miller, et al

It is certified that error appears in the above—identified patent and that said Letters Patent is hereby corrected as shown below:

Column 7, line 68: last word "be" change to read "by"

Column 8, line 5: "$\geq 0.3$" should be -- $\leq 0.3$ --

Column 8, line 11: "50.000" should be -- 50,000 --

Signed and Sealed this

Twenty-eighth Day of December 1982

[SEAL]

Attest:

GERALD J. MOSSINGHOFF

Attesting Officer    Commissioner of Patents and Trademarks